United States Patent

Verhoeven et al.

[11] Patent Number: 5,062,100
[45] Date of Patent: Oct. 29, 1991

[54] COMBINATION DISC CASSETTE AND APPARATUS FOR REMOVING DISC THEREFROM

[75] Inventors: Robertus J. M. Verhoeven; Cornelis M. Beijersbergen van Henegouwen; Gerardus L. C. Elders: Cornelis Ouwerkerk, all of Eindhoven, Netherlands

[73] Assignee: U.S. Philips Corporation, New York, N.Y.

[21] Appl. No.: 239,810

[22] Filed: Sep. 2, 1988

[30] Foreign Application Priority Data

Sep. 17, 1987 [NL] Netherlands ............ 8702222

[51] Int. Cl.$^5$ .............................................. G11B 5/82
[52] U.S. Cl. .................................. 369/291; 369/772; 369/752; 360/133
[58] Field of Search .................. 369/77.2, 75.2, 291; 360/49.02, 133

[56] References Cited

U.S. PATENT DOCUMENTS

| | | | |
|---|---|---|---|
| 4,138,703 | 2/1979 | Stave et al. | 369/77.2 |
| 4,463,849 | 8/1984 | Prusak et al. | 364/77.2 |
| 4,481,617 | 11/1984 | Mabry | 369/77.2 |
| 4,755,982 | 7/1988 | Douwes | 369/77.2 |

Primary Examiner—William M. Shoop, Jr.
Assistant Examiner—John W. Cabeca
Attorney, Agent, or Firm—Bruce L. Adams; Van C. Wilks

[57] ABSTRACT

A disc cassette (1) has an outer case (4) with a front opening which is closed by a shutter (8) and latched in the case by a movable latching device. The apparatus has a device to release the shutter of an inserted disc cassette and with the aid of a withdrawal mechanism withdraws the shutter from the case when the case is withdrawn from the apparatus. The movable latching device for latching the shutter (8) in the case (4) comprises a movable part (14) of the case, and the release device of the apparatus comprises an insertion element (18A, 18B) which penetrates between the shutter and the case when the loaded disc cassette is inserted, thereby moving the movable part of the case to a free position in which the shutter is no longer latched in the case.

12 Claims, 6 Drawing Sheets

COMBINATION DISC CASSETTE AND APPARATUS FOR REMOVING DISC THEREFROM

BACKGROUND OF THE INVENTION

The invention relates to a system for recording/reading information on/from a disc. A disc cassette for a rotatable disc has outer case comprising main walls parallel to the disc, side walls, and a front opening which communicates with a disc-receiving space, a combined shutter and disc holder for closing the front opening of the case and movable latching means which are movable by external means from a latching position in which the shutter is latched in the case, to a free position in which the shutter can be slid out of the case; apparatus into which the disc cassette is introduced has release means for releasing the shutter of an inserted disc-cassette and a withdrawal mechanism for withdrawing the shutter and disc holder from the case and retaining the shutter and the disc in the apparatus during withdrawal of the case.

U.S. Pat. No. 4,164,782 (herewith incorporated by reference) discloses such a system intended for capacitively scanned video discs carrying information in the bottom of a groove in the surface of the disc. In view of the very fine structure of the grooves and the information, the disc must be protected adequately against dust and other extraneous influences. A ribbon-like element is attached to the shutter of the disc cassette and surrounds the disc with clearance to withdraw the disc from the case during removal of the case from the apparatus.

The movable latching means with which the shutter is latched in the case include two resilient plastics latching limbs which are integral with the plastics shutter and which are disposed on one side of the disc. At their free ends the latching limbs each carry a latching projection, which projections engage in corresponding recesses in the inner side of the sleeve when the shutter is disposed on the case to retain the shutter in the case. The latching limbs are movable from the latching position to the free position by the release means of the apparatus which at the location of the front opening are in contact with the free ends of the latching limbs to deflect these limbs to such an extent that the latching projections are disengaged from the corresponding recesses, thus enabling the shutter to be withdrawn from the case. The shutter has a central recess with stops at both sides to cooperate with the withdrawal mechanism of the apparatus. The relevant parts of the withdrawal mechanism engage behind the stops, so that once the loaded disc cassette has been inserted fully, the latching limbs are moved to the free position by the release means of the apparatus and at the same time the withdrawal mechanism cooperates with the stops in the centre of the shutter. Withdrawal of the case results in the shutter together with the video disc being withdrawn from the case.

In the known system the resilient latching means form part of the shutter. If the latching limbs should perform their function properly, also in the long run, they must be comparatively long and/or thin to avoid excessive material stresses. A great length of the limbs is undesirable because this results in larger dimensions of the shutter and, consequently, the disc cassette. Thin latching limbs have the drawback that they are vulnerable and weak and therefore in particular when they are made of a plastics, cannot guarantee a safe and reliable long-term storage of the heavy video disc, which has a diameter of approximately 30 cm.

Relaxation effects often occur in the case of prolonged loading of a plastic spring, which under load a plastics spring tends to deform lastingly with a consequent reduction in resilience. After removal of the load the spring fails to resume its origin al position, although in many cases it is possible, depending on the type of plastic used, that in time the spring ultimately resumes its original position.

In particular in professional systems, where the disc cassette contains for example a professional optical disc, it is not unlikely for the disc cassette to remain in the apparatus for a longer period. The system may form part, of the peripheral equipment of a computer and the disc may be provided with a fixed computer-readable program. For such uses it is therefore unfavourable if in the long run the latching performance of the shutter latching means should degrade owing to relaxation effects, which increase with increasing temperature. However, the electronic circuitry and electric motors and transformers used in the apparatus inevitably raise the temperature in such an apparatus higher than room temperature and not unlikely to 70° C. or higher.

It has been proposed to provide the apparatus with a release mechanism of a type which does not permanently load, or which at least loads only moderately, the latching means of the disc cassette once the case has been withdrawn from the apparatus U.S. Pat. No. 4,239,238, herewith incorporated by reference, describes a system in which the Patent Specification the release means in the apparatus, after removal of the case, are moved by the latching means of the shutter itself, opposed by a moderate spring force, to a position in which the latching limbs are subjected only to moderate spring force. In a known video-disc system the plastic latching limbs for latching the shutter in the disc cassette are replaced by metal latching limbs. The metal latching limbs are embedded in the plastic material of the shutter and carry plastic projections at their free ends. This solution precludes or at least mitigates the relaxation problem, but also leads to an undesired increase in the number of parts and to complications and increased cost of the production process. Moreover, in view of the requirements to be met by the spring material, including freedom from corrosion, this means that a comparatively expensive material such as phosphor bronze must be chosen.

SUMMARY OF THE INVENTION

It is an object of the invention to provide a system of a disc cassette and an apparatus of simple yet reliable construction, in which the dimensions of the disc cassette do not become unnecessarily large and in which the movable latching means of the disc cassette do not exhibit relaxation problems. The movable latching means include a movable part of the case and the release means include an insertion element which penetrates between the shutter and the case when a loaded disc cassette is inserted into the apparatus, to move the movable part of the case to its free position.

The invention makes inventive use of the fact that, although the disc and the shutter can together remain in the apparatus for a prolonged time, the case remains inside the apparatus only while a disc is loaded into or removed from the apparatus. Resiliently movable latching means which form part of the case are thus invariably disengaged from their latching position for an instant only and never for a prolonged time. Moreover, the invention is based on the recognition of the fact that the case is a simple part which can readily perform the additional function of latching the shutter without the need to make the case larger. Now the latching function need no longer be performed by the shutter, enabling the size of the shutter to be reduced. This also enables the dimensions of the disc cassette itself to be reduced. Since the case is kept outside the apparatus during the time that the shutter and the disc are inside, the case is practically not subjected to the temperature prevailing in the apparatus, so that the temperature related problems do not occur.

The movable part of the case may be disposed in a main wall of the disc cassette, the front opening of the disc cassette being long in relation to the thickness of the main walls of the case; A resilient displacement of a part of the main wall requires only a moderate force, producing comparatively low stresses in the material of the sleeve.

U.S. Pat. No. 4,413,333 discloses a system in which for withdrawing the disc from the case the withdrawal mechanism in the apparatus comprises elements which penetrate between the shutter and the case and thereby urge apart the main walls of the case. However, in this system the shutter is latched in the case by latching means which form part of the shutter and which are adapted to cooperate with the side walls of the case. In its central area the shutter is provided with means which are adapted to cooperate with the withdrawal mechanism. Since the shutter is not provided with means which can withdraw the disc from the case, the withdrawal mechanism cooperates not only with the shutter but also with the disc edge. For this purpose the edge of the disc is thickened for gripping by the withdrawal mechanism. Although in this known system the case is prized open at the location of the front opening, this known system, unlike the present invention, does not make inventive use of the possibility of latching the shutter by means of moving parts of the sleeve. Therefore, this known system has the same drawbacks as the aforementioned known system, i.e. larger dimensions of the shutter and hence of the disc cassette and, possibly, problems owing to relaxation effects in the resilient latching limbs. Moreover, owing to the absence of means connected to the shutter for the withdrawal of the disc from the case, the disc must have a thicknened edge, which means that the cassette is also required to have the necessary space in the thickness direction and is consequently required to be somewhat thicker.

Part of the main wall may include a strip which directly adjoins the front opening and which is separated by a slot from the part of the main wall which is more remote from the front opening. The presence of the slot enables the portion of the main wall situated between the front opening and the slot to be moved independently of the more remote part of the main wall. Thus, a smaller force is needed than in the absence of the slot.

Another advantageous embodiment is characterized in that over the greater part of the front opening the shutter is situated between the main walls of the case and over this part the front edges of the two main walls and the front side of the shutter are disposed in substantially the same plane perpendicular to the main at both front corners the case has a truncation intersecting the two main walls and the local side wall, and the shutter is provided with corner portions corresponding to the two truncations and having the same thickness as the case. The principal feature of this embodiment is that the disc cassette does not become unnecessarily large because the shutter does not project from the case. Nevertheless, the likelihood of the corners of the case being damaged is mitigated effectively by providing the case with truncations which are filled by portions of the shutter. Thus, when the front corners of the disc cassette are subjected to shocks these are absorbed by the rigid shutter and not by the front corner portion of the case. Another advantage of this embodiment is that the shutter remains accessible at the corners to allow it to be manipulated by hand. By bending the main walls of the case slightly apart with the aid of a simple tool the shutter can be slid out of the sleeve by pulling at the corner portions. This may sometimes be desirable for replacing or inserting a disc in the disc cassette by hand.

Suitably, the last-mentioned embodiment may be characterized in that in its side walls adjoining the side walls of the case the corner portions of the shutter are formed with recesses enabling the shutter to cooperate with transport means of an automatic transport system in an automatic apparatus. There is a growing tendency to equip apparatuses with an automatic loading mechanism which automatically draws the disc cassette inwards by means of a motor. The distance over which the disc cassette must be inserted into the apparatus by hand is then only small. The corner portions of the shutter are very suitable to cooperate with the automatic transport means of the apparatus. The walls of the case are relatively thin and therefore less suitable. The recesses in the corner portions of the shutter are engageable by transport elements of the automatic transport system.

Most apparatuses adapted for use in conjunction with disc cassettes comprise a front panel with a substantially rectangular entry slot for the passage of the disc cassette embodiment of the invention which is characterized in that a a blocking element may be arranged in at least one of the corners of the entry slot and in that the side walls of the disc cassette may have a cross-sectional shape adapted to the shape of the blocking elements, allowing a loaded disc cassette to be inserted into the entry slot of the apparatus in only one orientation. These steps simply and effectively preclude misinsertion of a loaded disc cassette. Preferably, in accordance with a further characteristic feature of the invention, a blocking element is arranged in three of the four corners of the entry slot. This ensures that an incorrectly oriented disc cassette cannot be introduced partly into the apparatus, which might occasion the user to think that insertion is possibly by pushing hard.

A simple system is obtained by arranging the latching means of the disc cassette near the centre of the front opening, the release means and the withdrawal mechanism of the apparatus being combined to form a single mechanism, and the shutter and the insertion element having cooperating portions for withdrawing the shutter from the case. The simplicity of this system resides in the fact that only one mechanism is needed which serves both for releasing and for withdrawing the shutter from the sleeve.

The last-mentioned embodiment is suiably characterized further in that during insertion of a loaded disc cassette the insertion element, as it penetrates between the case and the shutter, is moved against spring force from an initial position to a first position in which it bears on the shutter and in which the case is disengageable from the shutter, and during withdrawal of the case the shutter is withdrawn from the case by cooperation between the insertion element and the shutter. During subsequent re-insertion of an empty case the insertion element is moved against spring force by a main wall of the case to a second position which is more remote from the initial position and in which the element bears on the main wall of the case. The case together with the shutter which is re-latched therein can be withdrawn from the apparatus, the insertion element sliding over the main wall to be returned to the initial position under the spring force. Thus, in this embodiment both the release and the withdrawal of the shutter from the case depend entirely on movements of the disc cassette itself, which movements are simply transmitted directly to the mechanism in the apparatus, opposed by spring force.

The invention, not only relates to a system comprising a disc cassette and an associated apparatus but also to the disc cassette and to the apparatus itself:

DETAILED DESCRIPTION OF THE PREFERRED EMBODIMENTS

Figure 1:
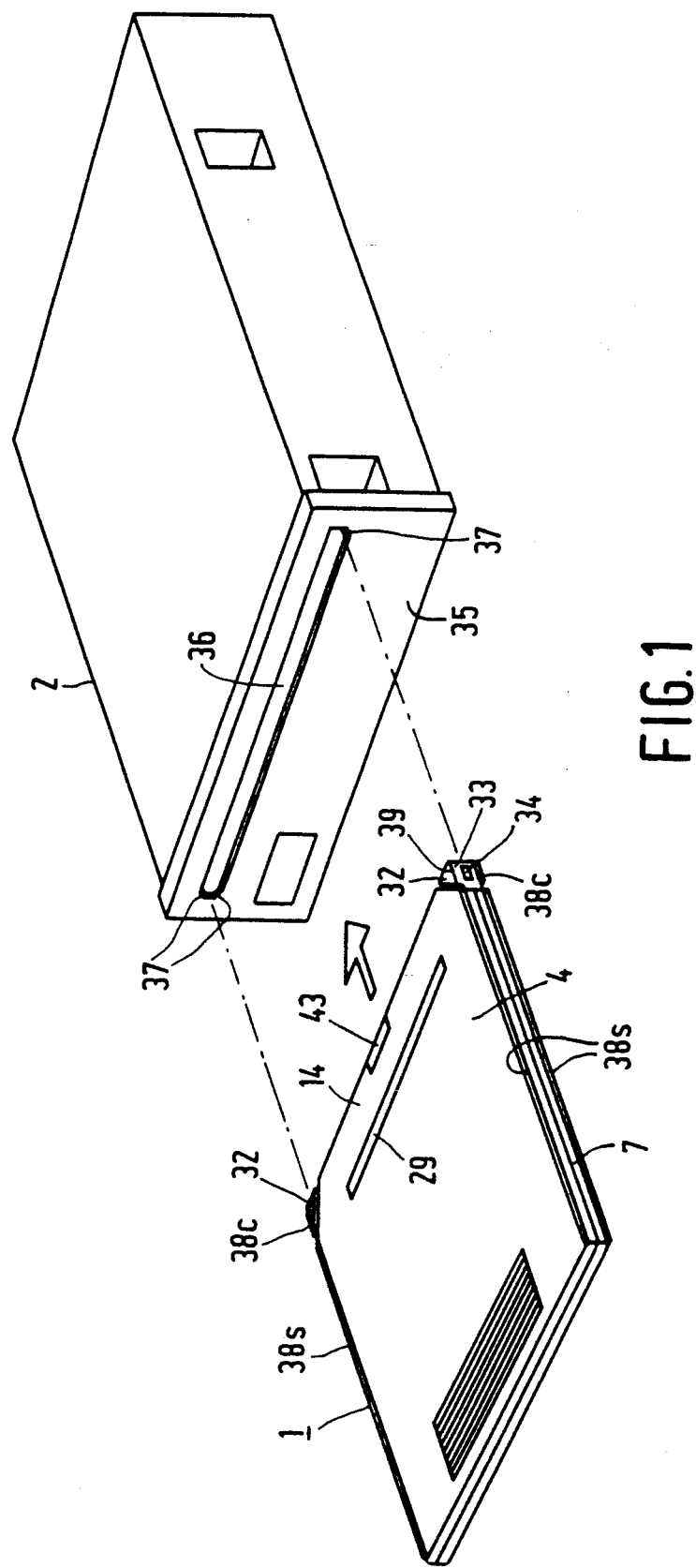
FIG. 1 is a perspective view of the system
Figure 2:
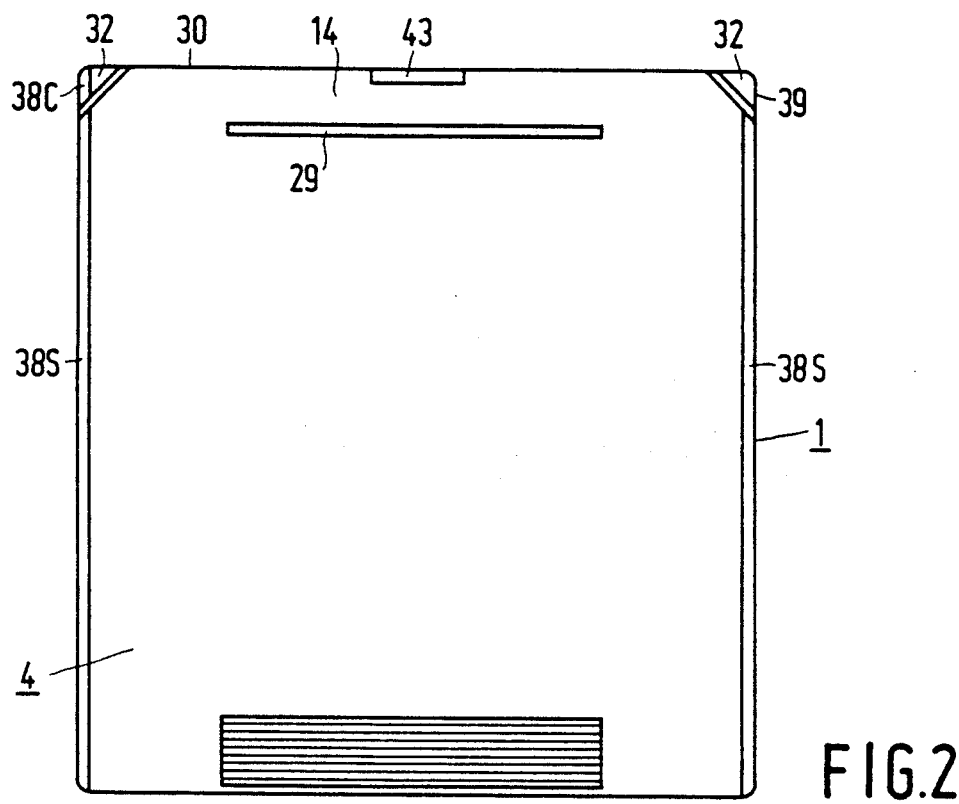
FIG. 2 is a plan view of the disc cassette of FIG. 1.
Figure 3:
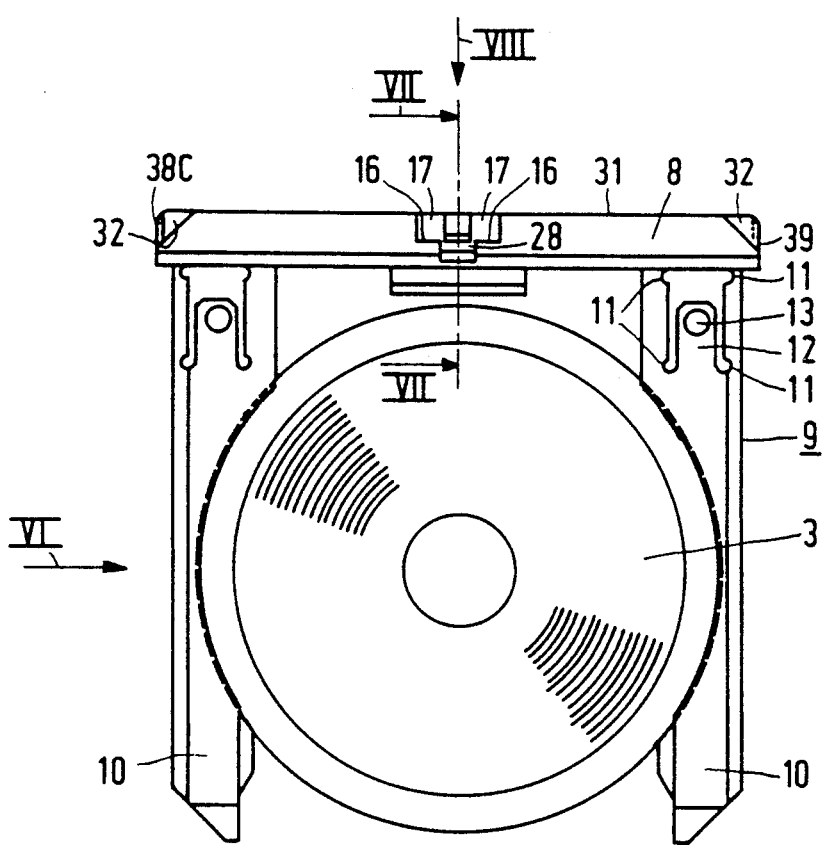
FIG. 3 is a plan view of the shutter and the disc of the disc cassette shown in FIG. 1, which shutter together with disc-retaining means constitutes a disc holder.
Figure 4:
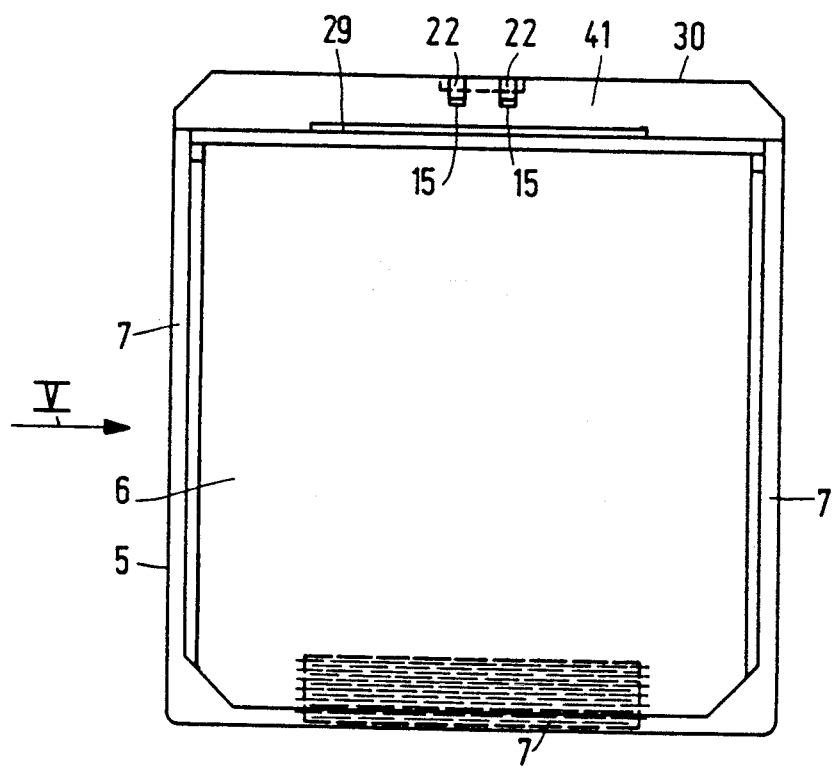
FIG. 4 is an view of one of the two identical shells forming the case of the disc cassette of FIG. 2.
Figure 5:
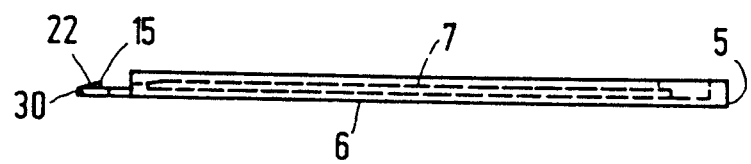
FIG. 5 is a side view taken on the line V in FIG. 4.
Figure 6:
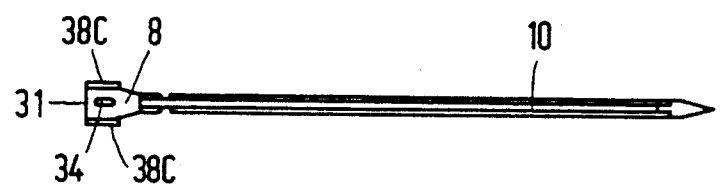
FIG. 6 is a side view of the disc holder shown in FIG. 2, taken on the line VI.
Figure 7:
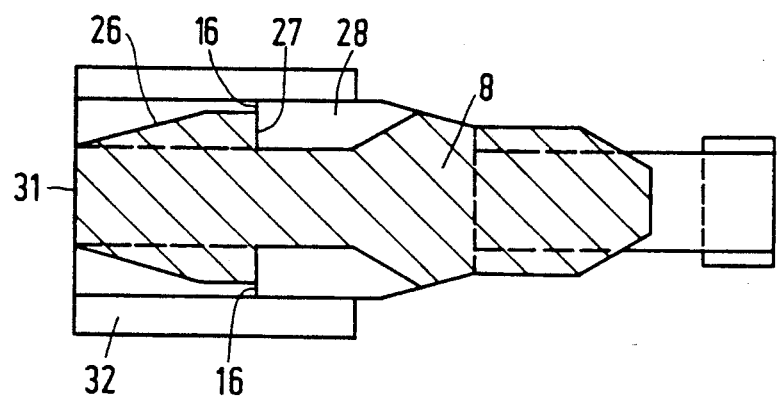
FIG. 7 is an enlarged-scale sectional view of the disc holder of FIG. 3, taken on the line VII.
Figure 8:
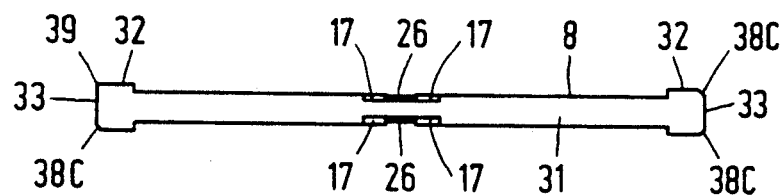
FIG. 8 is a view of the disc holder of FIG. 3, taken on the line VIII.
Figure 9:
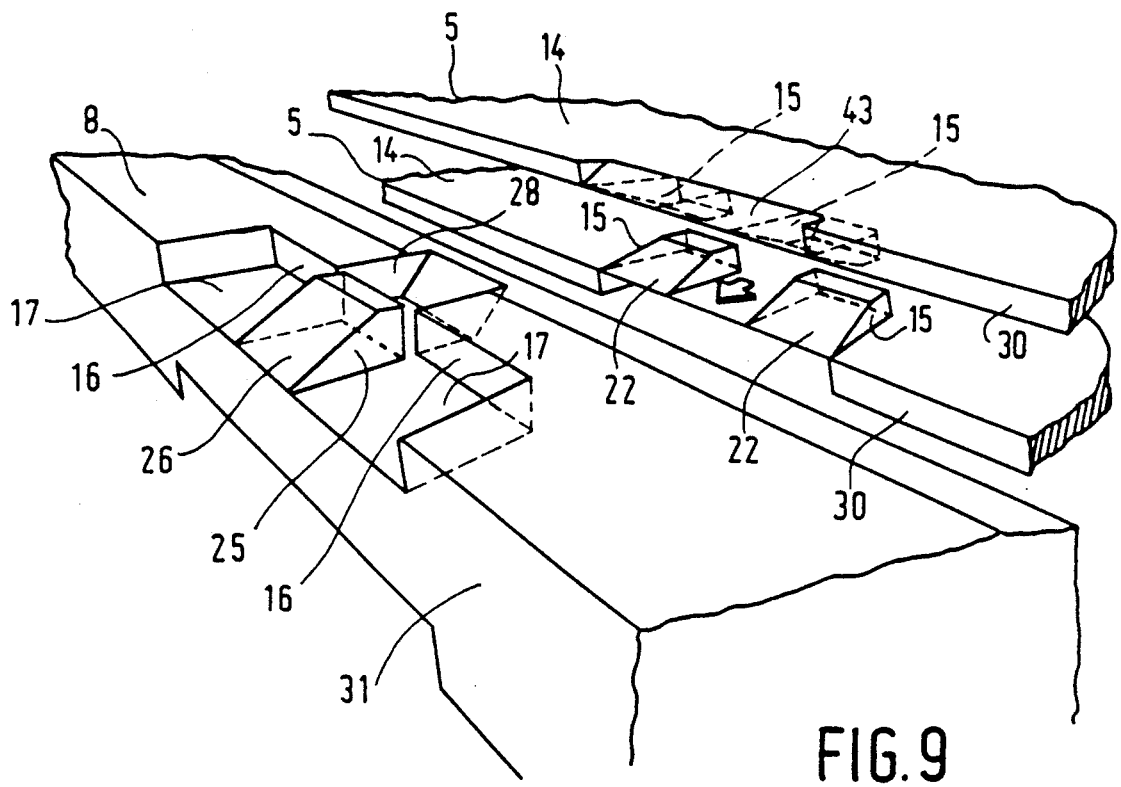
FIG. 9 is an enlarged-scale perspective view showing a part of a shutter and a part of a slightly withdrawn case at the location of the latching means.
Figure 11:
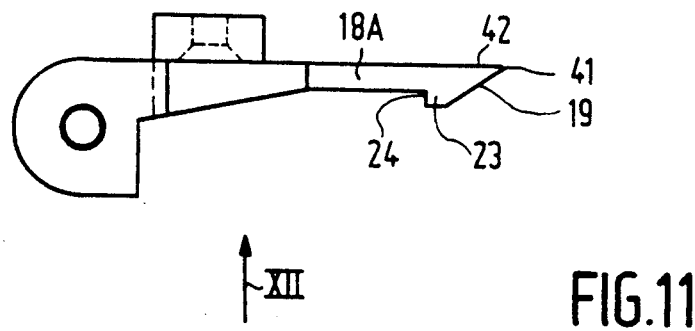
FIG. 11 is a side view of an insertion element of the mechanism of FIG. 10.
Figure 12:
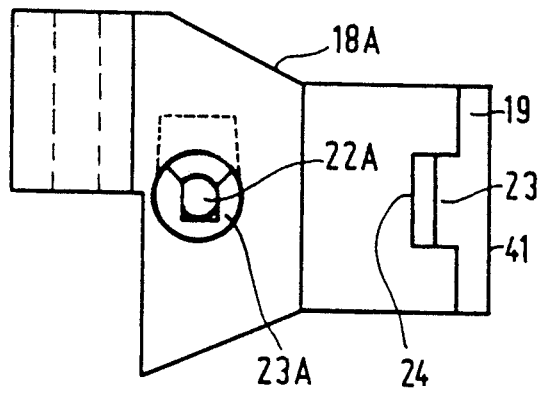
FIG. 12 shows the insertion element in a view taken on the line XII in FIG. 11.

FIG. 1 shows the comprises a disc cassette 1 and an apparatus 2. The disc cassette comprises a rotatable disc 3, which in the present case is an optically readable disc in conformity with the Compact Disc format, provided with data, also referred to as a CD-ROM disc (CD Read Only Memory). The disc cassette further comprises an external case 4, comprising two identical shells 5 secured to each other. The case comprises two main walls 6 extending parallel to the disc 3, side walls 7, and a front opening in one of its sides, which opening communicates with the disc-receiving space between the main walls. A shutter 8 is provided for closing the front opening. In the present embodiment the shutter 8 forms part of a disc holder 9, which in addition to the shutter comprises two jaws 10 for resiliently holding the disc 3. The entire disc holder 9 is made of a suitable plastics. The jaws 10 are locally formed with integral hinges 11, by which they are connected to the shutter 8 so as to be elastically translatable. By means of a mechanism provided for this purpose in the apparatus the two jaws 10 can be moved radially outward to release the disc 3. For the actuation by the apparatus limbs 12 are provided, which limbs each have an opening 13 through which an actuating pin of the apparatus can be inserted. For further details on such a disc holder and the cooperating mechanism in an apparatus reference is made to U.S. Pat. No. 4,849,958, incorporated herewith.

The disc cassette comprises movable latching means which are movable with the aid of external means from a latching position, in which the shutter 8 is latched in the case 4, and a free position, in which the shutter can be slid out of the case. These latching means comprise include movable parts 14 at the top and bottom of the case. Two latching projections 15 on the inner side of each main wall of the case, which latching projections abut against abutment surfaces 16 of the shutter when the disc cassette is closed. The abutment surfaces 16 of the shutter constitute bounding walls of recesses 17 at the front of the shutter, which recesses are engageable by the latching projection when the case is closed.

To release the shutter it is necessary to move the resilient limbs at the front of the case over such a height that the latching projections are disengaged from the recesses 17. For this purpose the apparatus is provided with the appropriate release means. These release means comprise two insertion elements 18 which upon introduction of a loaded disc cassette into the apparatus penetrate between the shutter 8 and the case at opposite sides to move the movable part 14 of the case to its free position. In order to facilitate insertion of the insertion elements these elements are each formed with an inclined surface 19 at their free ends 41.

The insertion elements are constructed as pivotal levers, which are pivotable about a pin 20. They are resiliently urged towards one another by a tension spring 21. This spring is connected to a point of attachment 22A, 22B situated above an opening, 23A and 23B respectively. By inserting the insertion elements between the case and the shutter the latching projections 15 are lifted out of the recesses 17 in the shutter 8 by deflection of the strip-shaped parts 14 of the main walls of the case. To facilitate insertion the latching projections 15 have inclined surfaces 22 at their front sides.

In order to enable the shutter 8, after it has been released, to be withdrawn from the case 4, the apparatus is equipped with a withdrawal mechanism. Said insertion elements form part of this withdrawal mechanism. For the withdrawal function the insertion elements are provided with withdrawal projections 23 which are disposed partly in the inclined plane 19 at the insertion side of the insertion elements. At the back they comprise a straight abutment surface 24. The shutter 8 also comprises a withdrawal projection 25 having an inclined surface 26 and an abutment surface 27. In the shutter a recess 28 is formed to accommodate the withdrawal projection 23.

The movable part of the main wall 6 includes a strip which directly adjoins the front opening of the case and which is separated by a slot 29 from that part of the main wall which is more remote the front opening.

The shutter 8 is situated between the main walls 6 of the case over the greater part of the front opening and over this part the front edges 30 of the case and the front 31 of the shutter are disposed in substantially the same plane perpendicular to the main walls. At each front corner the case has a truncation intersection the two main walls 6 and the side wall 7 at this locations. The shutter 8 comprises corner portions 32 corresponding to the two truncations and having a thickness equal to that of the case. Thus, also when the disc cassette is closed, the shutter is accessible by the fingers of a hand, so that when the shutter is released from the case by suitable tools the shutter, and in the present case also the disc, can be withdrawn from the case. Another effect of the presence of the corner portions 32 is that the vulnerable corner portions of the case near the front opening cannot be damaged. The side walls 33 of the corner portions 32, which adjoin the side walls 7 of the case, are formed with recesses 34 enabling the shutter to cooperate with transport means which are not shown in the drawings and which are not deseribed any further) of an automatic transport system in an automatic apparatus.

The apparatus 2 has a front panel 35 with a substantially rectangular entry slot 36 for the passage of the disc cassette. In three corners of the entry slot 36 a blocking element 37 is arranged. The blocking elements comprise portions of the front panel 35 which are bevelled at an angle of 45° and are disposed in the corners of the entry slot 36. The front of the disc cassette has a cross-sectional shape adapted to the shape of the blocking elements 37. Therefore, the case of the disc cassette is bevelled at 45° at all the edges 38S and the shutter at three edges 38C. This means that the shutter has only one edge 39 which is not bevelled, so that a loaded disc cassette can be introduced into the entry slot of the apparatus in only one orientation, namely that shown in FIG. 1. The bevelled edges 38S of the case of the disc cassette are continued as bevelled edges 38C at the corner portions 32 of the shutter. Thus, said simple means effectively preclude misinsertion of a loaded disc cassette. The bevelled edges 38S have the additional advantage that at least at these locations the disc cassette has no sharp edges, which reduces the risk of damage.

The latching means 15 of the disc cassette are arranged near the front opening, where they readily give direct access to the insertion elements 18 of the apparatus. As already stated, these release means are combined with the withdrawal mechanism of the apparatus. Thus, the release means and the withdrawal mechanism together form a single mechanism. This combined mechanism includes the two insertion elements 18A, 18B with their withdrawal projections 23, the spring 24, the pin 20 on which the two insertion elements are mounted, and a stop 40 situated between the two insertion elements. Near the rear wall of the apparatus 2 the pin 20 is rigidly connected to the chassis. The two insertion elements can perform a limited pivotal movement about the pin but they are constantly urged towards one another by the spring 21. The stop 40 arranged between the two pivotal arms defines the initial position occupied by the two insertion elements in the absence of a disc in the apparatus. Since the two insertion elements are pivotable independently of each other it is guaranteed that each insertion element, independently of the other, can adapt itself to the shape and to the position of the parts of the disc cassette with which it cooperates at a given instant.

Figure 10A:
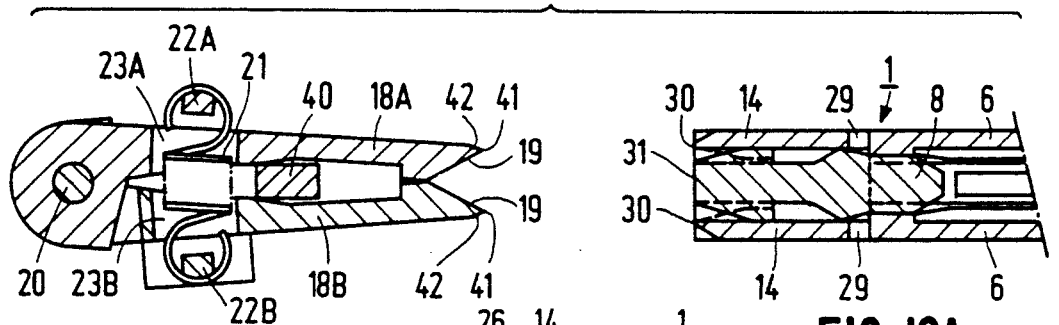
FIG. 10A to 10F illustrates stages in the cooperation between a disc cassette and the mechanism provided in the apparatus for releasing the disc holder and withdrawing the holder from the case and for reinserting the disc and the disc holder in the case and latching the disc holder inside the case.

The operation during introduction of a disc cassette into the apparatus, the subsequent withdrawal of the shutter from the sleeve, the subsequent re-insertion of an empty case and the re-insertion of the shutter into the case will now be described in detail with reference to FIG. 10. FIG. 10A illustrates the initial situation, in which a disc cassette 1 is introduced into the apparatus and moves towards the combined release and withdrawal mechanism. As already stated, the latching projections 15 of the case and the withdrawal projection 25 of the shutter are situated in the of the front opening. Behind the entry slot 36 the apparatus has guideways, not shown, for the disc cassette. This guarantees a well-defined sliding movement of the disc cassette inside the apparatus. The two insertion elements 18A and 18B are arranged at such a location in the apparatus that they are situated opposite the centre of the front opening of an inserted disc cassette.

Figure 10B:
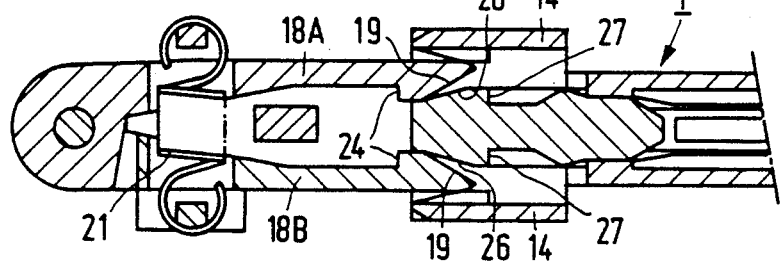

The two insertion elements comprise a relatively acute insertion edge 41 which is bounded by the inclined surface 19 at one side and by an inclined surface 42 at the other side. Thus, the insertion element is adapted to the inclined surfaces 22 and 26 of the latching projection 15 and the withdrawal projection 25 respectively. In the initial position, FIG. 10A, the edges 41 are situated exactly at the location where they can penetrate between the case 6 and the shutter 8 of the disc cassette. If the disc cassette is moved further towards the combined mechanism, starting from the situation shown in FIG. 10A, the edges 41 will penetrate between the case and the shutter in the centre of the front opening, yielding the situation illustrated in FIG. 10B. In FIG. 10B the insertion elements have entered and, as a result of the cooperation of the inclined surfaces 26 of the shutter with the inclined surfaces 19 of the withdrawal projections of the insertion elements, the two insertion elements are moved slightly apart, opposed by the tension of the spring 21. The two strip-shaped parts 14 of the case are deflected from the latching position to a free position, in which the latching projections are no longer situated before the abutment surfaces 16 of the shutter, so that the shutter is no longer latched in position.

Figure 10C:
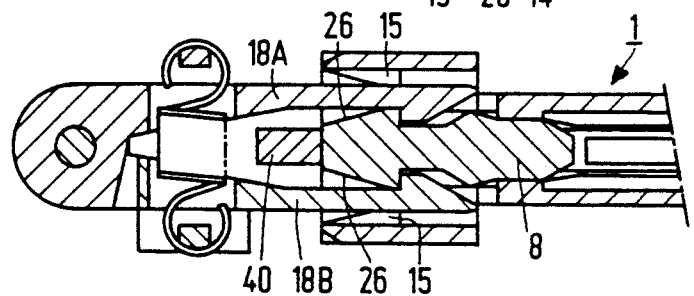
Figure 10D:
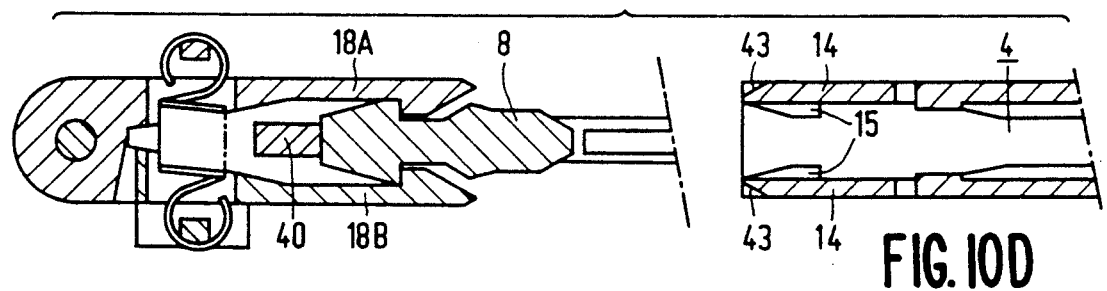

As the disc cassette is introduced further the insertion elements 18A and 18B move further over the inclined surfaces 6 of the shutter until the abutment surfaces 24 of the insertion elements engage behind the abutment surfaces 27 of the shutter, so that the withdrawal projections 23 of the insertion elements engage the recesses 28 in the shutter. Now the situation shown in FIG. 10C is obtained. In this situation the front 31 of the shutter just abuts against the stop 40 of the combined mechanism, so that the disc cassette 1 cannot be inserted further into the apparatus. Now the case can be withdrawn from the apparatus, see FIG. 10D, the latching projections 15 of the case sliding over the upper sides of the insertion elements 18A and 18B when the case is withdrawn. The parts 14 of the case are resiliently deflected only in the situations illustrated in FIGS. 10B and 10C. As soon as the case has been withdrawn from the apparatus, see FIG. 10D, the parts 14 are allowed to resume their original positions. Thus, the steps in accordance with the invention minimize the risk that the parts 14 are deformed permanently or for a longer period relative to their normal positions, which would impair a correct latching of a shutter in the case. The shutter 8, and hence the disc 3, can remain inside the apparatus in the positive shown in FIG. 10D for an unlimited time without the correct latching of the shutter in the case being affected in the long run.

Figure 10E:
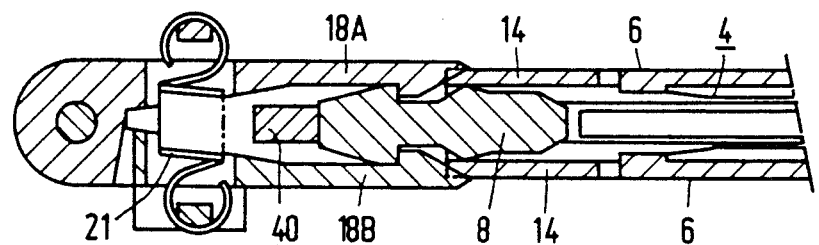

To reinsert the disc and shutter in the case an empty case is introduced through the entry slot 36 in the front panel 35 of the apparatus. FIG. 10E illustrates the situation in which the case has just contacted the insertion elements 18A and 18B. At the locations where they contact the insertion elements the parts 14 have bevelled edges 43. Thee facilitate cooperation with the inclined surfaces 19 of the insertion elements. Further introduction of the empty case 4 means that the insertion elements 18A and 18B are moved by the main walls 6 of the case opposed by the force of the tension spring 21, from the first position, shown in FIG. 10E, to a second position shown in FIG. 10F, which is situated further from the initial position and in which the elements bear on the main walls 6 at the location of the parts 14. The stop 40 of the withdrawal mechanism ensures that during insertion of the case the shutter 8 is not moved under the influence of friction.

Figure 10F:
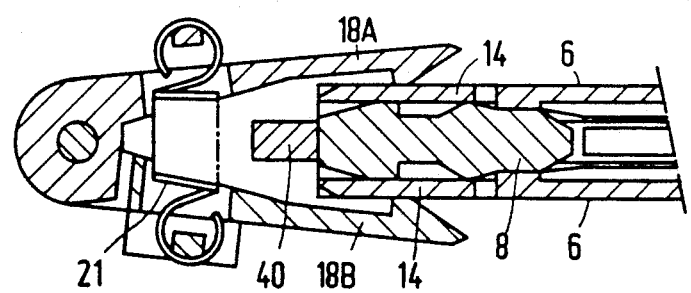

During the movement of the withdrawal elements from the first position, FIG. 10E, to the second position, FIG. 10F, the insertion elements do not obstruct engagement of the shutter 8 in the receiving space of the case, so that in the final situation illustrated in FIG. 10F the latching projections 15 of the case again engage the appropriate recesses 17 in the shutter and in fact are forced to do so by the force of the spring 21. Now the case together with the shutter latched therein can be withdrawn from the apparatus, the insertion elements sliding over the main walls of the case to return to their initial positions, illustrated in FIG. 10A, under the influence of the spring 21. The movable latching means need not form part of the main wall of the case, but alternatively they may form part of a side wall. However, in general an embodiment in which the movable latching means form part of the main wall will be preferred, because more room is available in the main wall. The latching means need not necessarily be situated in the centre of the front opening. In principle, it is also possible to arrange several off-centred latching means at different locations. An advantage of the embodiment shown is that only one set of latching means is provided to cooperate with one set of release means of the apparatus. This means that no synchronizing problems arise which could be the case if a plurality of mutually spaced release means were used.

If the release means are not situated in the centre of the front opening of an inserted disc cassette, it is possible to separate the functions of the release means and the withdrawal mechanism of the apparatus and to utilize distinctly different mechanisms for these functions.

Instead of latching projections 15 on the inner side of the case 4, which engage in recesses 17 of the shutter when the disc cassette is closed, it is possible to utilize an embodiment in which the latching projections are arranged on the shutter and the recesses are formed in the case. In such an embodiment a latching projection can serve as withdrawal projection as well. An advantage of such an embodiment would be that the case has no inwardly projection portions which could damage the disc surface.

It is possible to employ a mechanism comprising only one insertion element. In such an embodiment it is yet possible to construct the case from two identical shells each provided with latching means. In that case the shutter must be asymmetrical in such a way that the latching means at one side of the case engage in free spaces and consequently cannot perform a latching function. In the construction in which the shutter is provided with a latching projection and the case is formed with recesses to accommodate the latching projection, the solution is even simpler because then an asymmetrical shutter can be used, having only one or a plurality of latching projections at one side. The recesses situated at the other side of the case are then redundant.

What is claimed is:

1. A system for recording/reading information on/from a disc, comprising a disc cassette for containing a disc, said cassette comprising:
   an outer case having a pair of parallel main walls, a pair of side walls, and a front opening which communicates with a disc-receiving space defined by said main walls and said side walls, and
   a shutter for closing the front opening of the case,
   said outer case comprising a movable part for latching the shutter, said part being movable from a latching position in which the shutter is latched in the case, to a free position in which the shutter can be slid out of the case.

2. A system as claimed in claim 1, characterized in that said movable part (14) of the case (4) is disposed in a main wall (6) of the disc cassette.

3. A system as claimed in claim 2, characterized in that the movable part (14) of the main wall (6) comprises a strip which directly adjoins the front opening and which is separated by a slot (29) from the part of the main wall which is more remote from the front opening.

4. A system as claimed in claim 1, characterized in that
   over the greater part of the front opening the shutter (8) is situated between the main walls (6) of the case and over said part the front edges (30) of the two main walls and the front side (31) of the shutter are disposed in substantially the same plane perpendicular to the main walls,
   at both front corners the case has a truncation intersecting the two main walls (6) and a respective side wall (7), and
   the shutter (8) is provided with corner portions (32) corresponding to the two truncations and having the same thickness as the case.

5. A system as claimed in claim 4, characterized in that
   in its side walls (33) adjoining the side walls (7) of the case the corner portions (32) of the shutter are formed with recesses (34) enabling the shutter to cooperate with transport means of an automatic transport system in an automatic apparatus.

6. A system as in claim 1 further comprising an apparatus into which the disc cassette can be inserted, said apparatus comprising release means for releasing the shutter of an inserted disc cassette, said release means comprising an insertion element which penetrates the shutter and the case of an inserted cassette to move the movable part of the case to its free position, said apparatus further comprising a withdrawal mechanism for withdrawing the shutter from the case and for retaining the shutter and a disc in the apparatus during withdrawal of the case.

7. A system as in claim 6 further comprising latching projections arranged on each main wall near the centre of the front opening,
   the release means and the withdrawal means of the apparatus are combined to form a single mechanism, and the shutter (8) and the insertion element (18A, 18B) comprise cooperating portions (23; 26) for withdrawing the shutter (8) from the case (4).

8. A system as in claim 6 wherein during insertion of a loaded disc cassette (1) the insertion element (18A, 18B), as it penetrates between the case (4) and the shutter (8), is moved against spring force from an initial position to a first position in which it bears on the shutter and in which the case is disengageable from the shutter, and during withdrawal of the case the shutter is withdrawn from the case by cooperation between the insertion element and the shutter, and during subsequent re-insertion of an empty case (4) the insertion element (18A, 18B) is moved against spring force by a main wall (6) of the case to a second position which is more remote from the initial position and in which said element bears on said main wall of the case, so that the case together with the shutter which is latched therein can be withdrawn from the apparatus, the insertion element sliding over said main wall to be returned to the initial position under the spring force.

9. A system as claimed in claim 1, the apparatus (2) comprising a front panel (35) with a substantially rectangular entry slot (36) for the passage of the disc cassette, characterized in that a blocking element (37) is arranged in at least one of the corners of the entry the front of the disc cassette has a cross-sectional shape adapted to the shape of the blocking elements (37), allowing a loaded disc cassette (1) to be inserted into the entry slot (36) of the apparatus (2) in only one orientation.

10. A system as claimed in claim 9, characterized in that a blocking element is arranged in three of the four corners of the entry slot (36).

11. A system for recording/reading information on/from a disc, comprising an apparatus for recording/reading information on/from a disc inserted into the apparatus, and a disc cassette for containing a disc, said cassette comprising:

an outer case having a pair of parallel main walls, a pair of side walls, and a front opening which communicates with a disc-receiving space defined by said main walls and said side walls, and a shutter and disc holder for closing the front opening of the case, said outer case comprising a resiliently movable part for latching the shutter, said part being movable from a latching position in which the shutter is latched in the case, to a free position in which the shutter can be slid out of the case, and said apparatus comprising an insertion element for engaging the movable part of the outer case of a cassette inserted into the apparatus, for unlatching the shutter and disc holder thereby permitting withdrawal of the outer case from the apparatus while leaving the shutter and disc holder in an inserted position, whereby the resiliently movable part does not remain within the apparatus during recording/reading of information on/from the disc.

12. A system as claimed in claim 11, characterized in that:

said insertion element comprises a withdrawal projection, and said shutter has a recess arranged adjacent said movable part for engagement by said insertion element, engagement of the movable part by the insertion element deflecting the movable part sufficiently to permit said withdrawal projection to engage said recess.

* * * * *